Aug. 12, 1969 G. W. WHALEN 3,461,389

CIRCUIT FOR INITIATING A PULSE A PREDETERMINED TIME INTERVAL AFTER THE CENTER (OR OTHER POSITION) OF AN INCOMING PULSE

Filed Sept. 30, 1966

INVENTOR
GERALD W. WHALEN

BY John C. Black

ATTORNEY

United States Patent Office 3,461,389
Patented Aug. 12, 1969

3,461,389

CIRCUIT FOR INITIATING A PULSE A PREDETERMINED TIME INTERVAL AFTER THE CENTER (OR OTHER POSITION) OF AN INCOMING PULSE

Gerald W. Whalen, Owego, N.Y., assignor to International Business Machines Corporation, Armonk, N.Y., a corporation of New York Filed Sept. 30, 1966, Ser. No. 583,282
Int. Cl. H03k 5/20
U.S. Cl. 328—109 5 Claims

ABSTRACT OF THE DISCLOSURE

Incoming pulses are applied to a first signal path in which each input pulse is linearly integrated and to a second signal path in which each input pulse is delayed in time, linearly integrated and amplified. The outputs of the first and second paths are then applied to a voltage discriminator which initiates an output signal, when the output level of the second path exceeds that of the first path. When the signal level of the second path is amplified by a factor of two, or the signal level of the first path attenuated by a factor of one-half, the output of the discriminator will be initiated a predetermined time interval after the precise center of the input data pulse. If the relative amplification factor of the two paths is some value other than two, some other precise position in the input data pulse will be determined.

Figure 1:
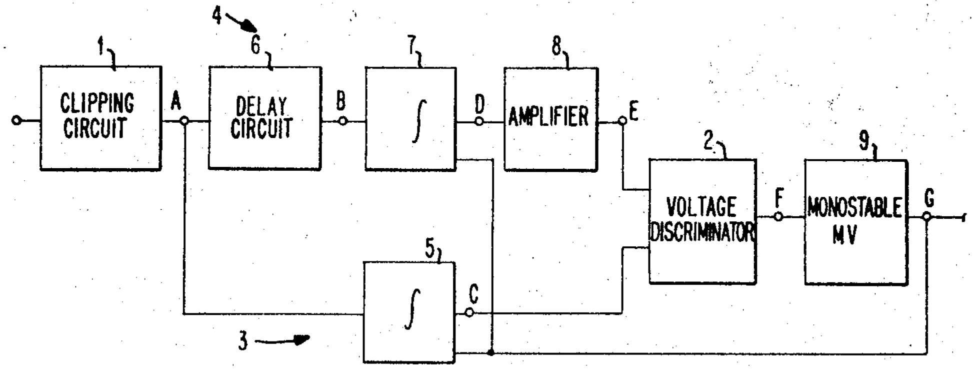

This invention relates to an improved, reliable means for determining the precise center positions of incoming data pulses. With slight modifications, it can also be used to find a position other than the precise center in the pulses.

In various types of data processing equipment it becomes desirable to determine the centers of data pulses; for example, in communications systems, signals received over transmission lines are typically distorted with respect to both phase and frequency. In certain types of apparatus, error rates are significantly reduced where the center of each pulse which may vary widely in width can be determined.

In character recognition equipment, the width of various portions of printed characters varies significantly. Accuracy and reliability can be improved by determining the precise centers of data pulses which are produced incident to the scanning of the succeeding portions of the printed characters.

Other schemes have been proposed for determining pulse centers. For example, the continuous analog signal can be differentiated and the point where the differential passes through zero detected. This scheme is very sensitive to noise and quite limited in handling wide pulses. Another approach uses two counters, one counting at one rate during the presence of the incoming pulse and the second counter starting to count at twice the rate after the end of the incoming pulse. Their outputs are added. This scheme is costly. A third approach would be to charge a capacitor at one rate during the presence of the incoming pulse and then twice the rate at the end of the pulse. The point where the capacitor voltage reaches a predetermined threshold is detected. This scheme is limited by variations in the capacitor and circuit components and requires a special circuit. My proposed new scheme can be implemented with standard analog and digital circuitry.

It is therefore the primary object of the present invention to provide an improved method and means for determining pulse centers, which method and means are simple, yet very reliable in operation.

It is a broader object of the present invention to provide a versatile means for determining selected positions in incoming data pulses.

These objects are achieved in a preferred embodiment of the present invention by providing a first signal path in which each input pulse is linearly integrated and a second signal path in which the input pulse is delayed in time, linearly integrated and amplified. The outputs of the first and second paths are then applied to a voltage discriminator which initiates an output signal, when the output level of the second path exceeds that of the first path. When the signal level of the second path is amplified by a factor of two, or the signal level of the first path attenuated by a factor of one-half, the output of the discriminator will be initiated a predetermined time interval after the precise center of the input data pulse. If the relative amplification factor of the two paths is some value other than two, some other precise position in the input data pulse will be determined.

The foregoing and other objects, features and advantages of the invention will be apparent from the following more particular description of a preferred embodiment of the invention, as illustrated in the accompanying drawings.

Figure 2:
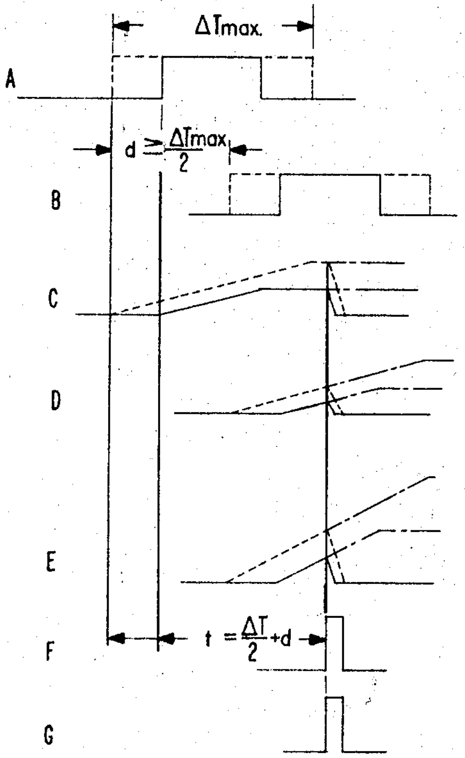

In the drawings:

FIG. 1 diagrammatically illustrates a preferred form of the present invention; and FIG. 2 shows waveforms illustrating the operation of the circuit of FIG. 1 when it is utilized to find pulse centers.

The preferred form of the circuit includes a clipping circuit 1 which receives incoming data signals from a source (not shown) and produces output signals of constant amplitude at A. The output of the circuit 1 is applied to a voltage discriminator 2 by way of first and second circuit paths 3 and 4.

The path 3 includes an integrator 5 which produces an output signal which is the linear integral of the output signal of the circuit 1. Output signals of the circuit 1 are delayed a predetermined time interval in the delay circuit 6, are linearly integrated in the integrating circuit 7 and are amplified in the amplifier 8.

In the preferred embodiment, the delay circuit 6 is a digital delay circuit to provide low cost and compact packaging.

The output signals of the paths 3 and 4 are applied to the voltage discriminator 2 and when the output level of the path 4 begins to exceed that of the path 3, the discriminator initiates an output signal which energizes a monostable multivibrator 9 to produce an output pulse of short duration compared with the width of the input data pulse. This output pulse is also used to discharge the integrators in a well-known manner. For example, the pulse can energize a relay (not shown) which closes its contacts to discharge the integrating capacitors (not shown) of the integrators 5 and 7.

Each of the waveforms A–G of FIG. 2 are those which appear at the corresponding junctions A–G of FIG. 1. The solid wave-form lines B–E are those which result at their respective junctions in response to one short time duration pulse A (solid line). The dotted waveform lines B–E are those which result at their respective junctions in response to the longest (i.e. maximum anticipated pulse width) time duration pulse A (dotted line), having its pulse center aligned in time with that of the solid line pulse A. The waveforms (solid and dotted line) of FIG. 2 illustrate the accuracy of the circuit of FIG. 1 in determining pulse centers irrespective of pulse width variations below the maximum anticipated width.

As seen in FIG. 2, the leading edge of the output pulse G from the multivibrator 9 occurs a predetermined time interval (equal to the delay *d* through circuit 6) after the center $\Delta T/2$ of the input data pulse. This assumes that the gain of the amplifier 8 is equal to two.

As seen in FIG. 2, the delay *d* must be equal to or greater than one-half duration $\Delta T_{max}$ of the widest anticipated input pulse. This relationship will insure that the level at C will have reached its maximum value by the time that the level at E reaches one-half its maximum value and then begins to exceed the level at C.

It is apparent that the wider the maximum anticipated pulse width, the longer the delay *d* must be. However, *d* should be maintained as short as possible since as *d* increases, the pulse frequency which can be handled decreases. Thus in the preferred embodiment, *d* is made equal to one-half the maximum anticipated pulse width.

Assuming that the gain of the amplifier 8 were three, the leading edge of the output pulse G from the multivibrator 9 would occur a predetermined time interval after the first one-third position of the incoming pulse A. In this instance, the delay *d* must be equal to or greater than two-thirds the time duration of the widest anticipated input pulse A.

A gain of four in the amplifier 8 results in an output pulse at F at an interval *d* after the first one-fourth position of the incoming pulse A, and so on. With a gain of four, *d* must be equal to or greater than three-fourths of the maximum input pulse width.

It will be appreciated that various other modifications may be made in the embodiment of FIG. 1 without departing from the teachings of the present application. For example, if the delay circuit used can delay continuous waveforms with minimum distortion, then path 4 can be reduced to an amplifier and a delay circuit without the integrator, thereby eliminating one integrator (7). In this scheme the node to enter path 4 would be at the output of the integrator in path 3, rather than the output of circuit 1, thereby uilizing the integrator 5 for both paths.

Similarly, if such a continuous waveform delay circuit is used, the positions of the amplifier 8 and the delay circuit 6 can be interchanged.

All that need be done in these modifications is to assure that the circuit is properly dimensioned so that the output of the path 4 reaches the value already existing at the output of the path 3 at the desired instant in time.

What is claimed is:

1. In apparatus for determining a predetermined position in each one of a series of substantially uniform amplitude input pulses, the combination comprising a source of input pulses, first means coupled to the source for producing an output signal which is a linearly integrated function of each input pulse;

second means coupled to the source for producing an output signal which is a greater linearly integrated function of each input pulse:

third means included in the second means causing the greater of the two integrated output signals corresponding to the same input pulse to be delayed a predetermined time interval with respect to the other output signal, which time interval is a predetermined function of the maximum anticipated input pulse width and the ratio of the greater of the output signals to the lesser; and fourth means coupled to both the first and second means and responsive to said integrated output signals corresponding to the same input pulse for initiating a pulse at an instant in time when the value of said greater one of the two integrated output signals exceeds the value of the other.

2. The apparatus of claim 1 wherein said predetermined time interval is not substantially less than one-half the time interval of the widest anticipated input pulse, and wherein the second means produces output signals which have a maximum amplitude which is twice that of output signals produced by the first means, thereby causing the fourth means to initiate a pulse said predetermined time interval after the exact center of each of said uniform amplitude input pulses.

3. The apparatus of claim 2 wherein said third means comprises a digital delay circuit coupling said uniform amplitude input pulses to the second means.

4. The apparatus of claim 3 wherein said second means comprises an integrator coupled to the digital delay circuit, and an amplifier having a voltage gain of two coupling the integrator to the fourth means.

5. The apparatus of claim 4 wherein the fourth means comprises a voltage discriminator circuit having inputs coupled to the first means and to the amplifier and having an output, and a monostable multivibrator coupled to the discriminator output.

References Cited

UNITED STATES PATENTS

| | | | |
|---|---|---|---|
| 2,677,761 | 5/1954 | MacNichol | 329—106 X |
| 3,316,491 | 4/1967 | Berman et al. | 328—127 X |
| 3,353,108 | 11/1967 | Branham | 329—107 |

ALFRED L. BRODY, Primary Examiner

U.S. Cl. X.R.

328—127; 329—107, 145